US008587670B2

(12) United States Patent
Wood et al.

(10) Patent No.: US 8,587,670 B2
(45) Date of Patent: Nov. 19, 2013

(54) AUTOMATIC CAPTURE MODES

(75) Inventors: Kenneth Wood, Cambridge (GB);
Stephen Hodges, Cambridge (GB);
Lyndsay Williams, Cambridge (GB);
James Srinivasan, West Yorkshire (GB);
Carsten Rother, Cambridge (GB);
Antonio Criminisi, Cambridge (GB);
John Chiloyan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 12/096,235

(22) PCT Filed: Nov. 16, 2006
(Under 37 CFR 1.47)

(86) PCT No.: PCT/US2006/044871
§ 371 (c)(1),
(2), (4) Date: Dec. 10, 2008

(87) PCT Pub. No.: WO2007/067335
PCT Pub. Date: Jun. 14, 2007

(65) Prior Publication Data
US 2010/0171846 A1  Jul. 8, 2010

(30) Foreign Application Priority Data
Dec. 5, 2005  (EP) .................................... 05257469

(51) Int. Cl.
*H04N 5/225*  (2006.01)
(52) U.S. Cl.
USPC .............. 348/207.99; 348/231.9; 348/231.99; 348/222.1

(58) Field of Classification Search
USPC ................. 348/231.9, 207.99, 231.99, 222.1; 396/49
See application file for complete search history.

(56) References Cited

U.S. PATENT DOCUMENTS 5,432,571 A * 7/1995 Aoki et al. .................... 396/318
5,819,124 A   10/1998 Somner et al.
6,301,440 B1  10/2001 Bolle et al.
(Continued)

FOREIGN PATENT DOCUMENTS

JP  2001086456 A   3/2001
JP  2005316883      11/2005

OTHER PUBLICATIONS

"Blackbox for memory—wearable camera is on our way", www.iNews24.com, Jun. 16, 2004.

(Continued)

*Primary Examiner* — Sinh Tran
*Assistant Examiner* — Paul Berardesca
(74) *Attorney, Agent, or Firm* — Zete Law, P.L.L.C.; MacLane C. Key

(57) ABSTRACT

An image capture device is described which is operable in any one of a number of capture modes. The device comprises a camera, a memory and a processor. The memory stores a plurality of sets of capture triggers, with each set of capture triggers being associated with one of the plurality of capture modes. The processor selects one of the plurality of capture modes, such that the device is operable in the selected capture mode. In the selected capture mode, an image is captured automatically when a capture trigger within the associated set of capture triggers is satisfied.

13 Claims, 11 Drawing Sheets

(56) References Cited

U.S. PATENT DOCUMENTS

| | | | |
|---|---|---|---|
| 6,476,858 B1 | 11/2002 | Ramirez Diaz et al. | |
| 2003/0081127 A1* | 5/2003 | Kirmuss | 348/207.99 |
| 2004/0101178 A1* | 5/2004 | Fedorovskaya et al. | 382/128 |
| 2004/0119877 A1* | 6/2004 | Shinozaki | 348/362 |
| 2004/0208496 A1 | 10/2004 | Pilu | |
| 2005/0012830 A1 | 1/2005 | Pilu | |
| 2005/0018073 A1 | 1/2005 | Pilu | |
| 2005/0174470 A1* | 8/2005 | Yamasaki | 348/345 |

OTHER PUBLICATIONS

"Blackbox for memory—wearable camera is on our way", www.iNews24.com, Jun. 16, 2004 [PCT Search Report is provided to explain the relevance of this Korean reference].

Translated Chinese Office Action mailed on Jan. 8, 2010 for Chinese Application No. 200680045520.8, a counterpart foreign application of U.S. Appl. No. 12/096,235.

European Office Action mailed on Sep. 21, 2010 for European Application No. 05 257 469.6-1522, a counterpart foreign application of U.S. Appl. No. 12/096,235.

European Patent Office Search Report dated Apr. 11, 2006, 6 pages.

Gemmelll et al, "Passive Capture and Ensuing Issues for a Personal Lifetime Store", Proceedings of the 1st ACM Worksop on Continauous Archiva nd Retreval of Personal Experiences, Oct. 2004, 8 pages.

Healey et al, "StartleCam: A cybenetic wearable camera", Second International Symposium on Wearable Computers, Pittsburgh, PA, Oct. 1998, 8 pages.

Translated Japanese Office Action mailed on Aug. 13, 2010 for Japanese Application No. 2008-544354, a counterpart foreign application of U.S. Appl. No. 12/096,235.

Final Office Action for JP Patent Application 2008-544354, mailed Apr. 12, 2011, counterpart of U.S. Appl. No. 12/096,235 "Automatic Capture Modes ," 5 pages.

* cited by examiner

AUTOMATIC CAPTURE MODES

RELATED APPLICATIONS

This application is a National Stage of International Application No. PCT/US2006/044871, filed Nov. 16, 2006, which claims priority from European Patent Application No. 05257469.6, filed on Dec. 5, 2005. Both applications are incorporated herein by reference.

BACKGROUND

SenseCam is a wearable camera developed by Microsoft Research, one of the applications of which is to assist with memory recall by enabling a user to rewind through the recent events experienced by the wearer of the device. This may be particularly useful for memory-impaired individuals, or where an individual has experienced a traumatic event (e.g. an elderly person's fall resulting in injury).

The device can capture very large numbers of images and in addition to capturing images, the device also records sensor data, such as movement, light level and temperature every second. This sensor data is used to trigger the capturing of images, for example, when there is a change in light level or sudden movement. A change in light level may indicate that a user has moved from one room to another, or from inside to outside and therefore the image captured will indicate a change in location (and environment) of the wearer. The presence of a person in close proximity to the camera may be detected, for example using a PIR (passive infrared) sensor and this may trigger the capture of an image. Consequently the captured images may be used to recall the people an individual met.

The device has a wide angle or fish-eye lens so that the user does not need to worry about pointing the device in a particular direction. An accelerometer is used for image stabilisation.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an image capture device operable in any one of a plurality of capture modes, the device comprising: an image sensor; a memory arranged to store a plurality of sets of capture triggers, wherein each set of capture triggers is associated with one of the plurality of capture modes; and a processor arranged to select one of the plurality of capture modes, such that the device is operable in the selected capture mode, wherein an image is captured automatically when a capture trigger within the associated set of capture triggers is satisfied.

Advantageously, this allows the operation of the device to be changed for different circumstances and different users, such that images are captured (e.g. photographs are taken) when different capture triggers are defined. This enables a user to tailor the capture triggers to a particular location/event/activity and enables different users of a single device to each customise the operation of the device.

Preferably, the processor is arranged to select one of the capture modes in response to an input received.

Preferably, the memory is arranged to store a set of mode change parameters and wherein the processor is arranged to re-select a capture mode in response to an input received and in accordance with the set of mode change parameters.

The input received may comprise at least one of: the time, a user input, a trigger from a calendar program, a signal received by a wireless receiver, a input received from a sensor, device status information and a mode sequence file.

Advantageously, if the input received comprises a trigger from a calendar program, the mode may be selected based on information on events in the calendar program.

Preferably, the input received is the time and wherein the set of mode change parameters comprises a sequence of modes and associated mode change times.

The device may further comprise a user input means, wherein the input received is received from the user input means.

The device may further comprise a sensor, and wherein at least one of the sets of capture triggers comprises a capture trigger defined with reference to an input of the sensor.

Preferably, at least one of the sets of capture triggers is user defined.

A second example provides a method of capturing images comprising the steps of: selecting a capture mode from a set of at least two capture modes; accessing a set of capture triggers associated with the selected capture mode; triggering capture of an image when an input received satisfies a capture trigger within the accessed set of capture triggers; and selecting another capture mode from the set of at least two capture modes when mode change parameters are satisfied.

Preferably, selecting a capture mode comprises: receiving an input; and selecting a capture mode from a set of at least two capture modes in accordance with the input received.

Preferably, receiving an input comprises receiving an input from one of a user, a sensor, a wireless receiver and a clock.

Preferably, triggering capture of an image comprises: receiving an input from one of a user, a sensor, a wireless receiver and a clock; and triggering capture of an image when the input received satisfies a capture trigger within the accessed set of capture triggers.

Preferably, the set of capture triggers comprises a capture trigger defined with reference to an input of a sensor.

Preferably, the set of capture triggers is user-defined.

Preferably, the mode change parameters define a set of user inputs.

Preferably, selecting another capture mode comprises: detecting a user input;
identifying that the detected user input is defined in the mode change parameters; and selecting another capture mode from the set of at least two capture modes based on the detected user input and the mode change parameters.

In another example, selecting another capture mode comprises: detecting a received signal via a wireless receiver; and selecting another capture mode from the set of at least two capture modes based on the received signal and the mode change parameters.

A third example provides a computer program comprising computer program code means adapted to perform any of the methods described above when the program is run on a computer.

The computer program described above may be embodied on a computer readable medium.

Another example provides a user interface comprising: a first element arranged to indicate a capture mode name; and a plurality of elements arranged to indicate a plurality of capture trigger values.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilised. The description sets forth the functions of the example and the sequence of steps for constructing and operating the example. However, the same or equivalent functions and sequences may be accomplished by different examples.

By using a camera which captures images automatically when triggered by sensor data a large number of images are obtained which may be used to assist with memory recall, as described earlier. However, a problem arises in some situations that large numbers of similar images are captured which uses up memory whilst providing no additional useful information. Such a problem may arise, for example, when the wearer is in a meeting and the camera triggers when a PIR sensor detects a person passing in front of the camera. During the meeting, the camera may be triggered repeatedly as the person facing the wearer gestures, writes notes or otherwise moves. This can lead to the camera capturing many images of the same person. Although the camera may have a large memory, the memory is not infinite and the duplicate images may occupy a significant proportion of the memory. This becomes more significant if the images are not downloaded frequently.

When the images are subsequently downloaded, the download time is increased unnecessarily by the duplicate images. When the images are then viewed, for example to try and locate a missing item, the duplicate images do not assist but instead may hinder the operation as there are more images to review. In the situation where the images are used to generate a diary, which may be uploaded to the internet, the duplicate images may be irritating to someone viewing the diary and they also increase upload time, (this may be significant over low data rate links). Consequently they may need to be deleted before uploading or saving the diary.

Figure 1:
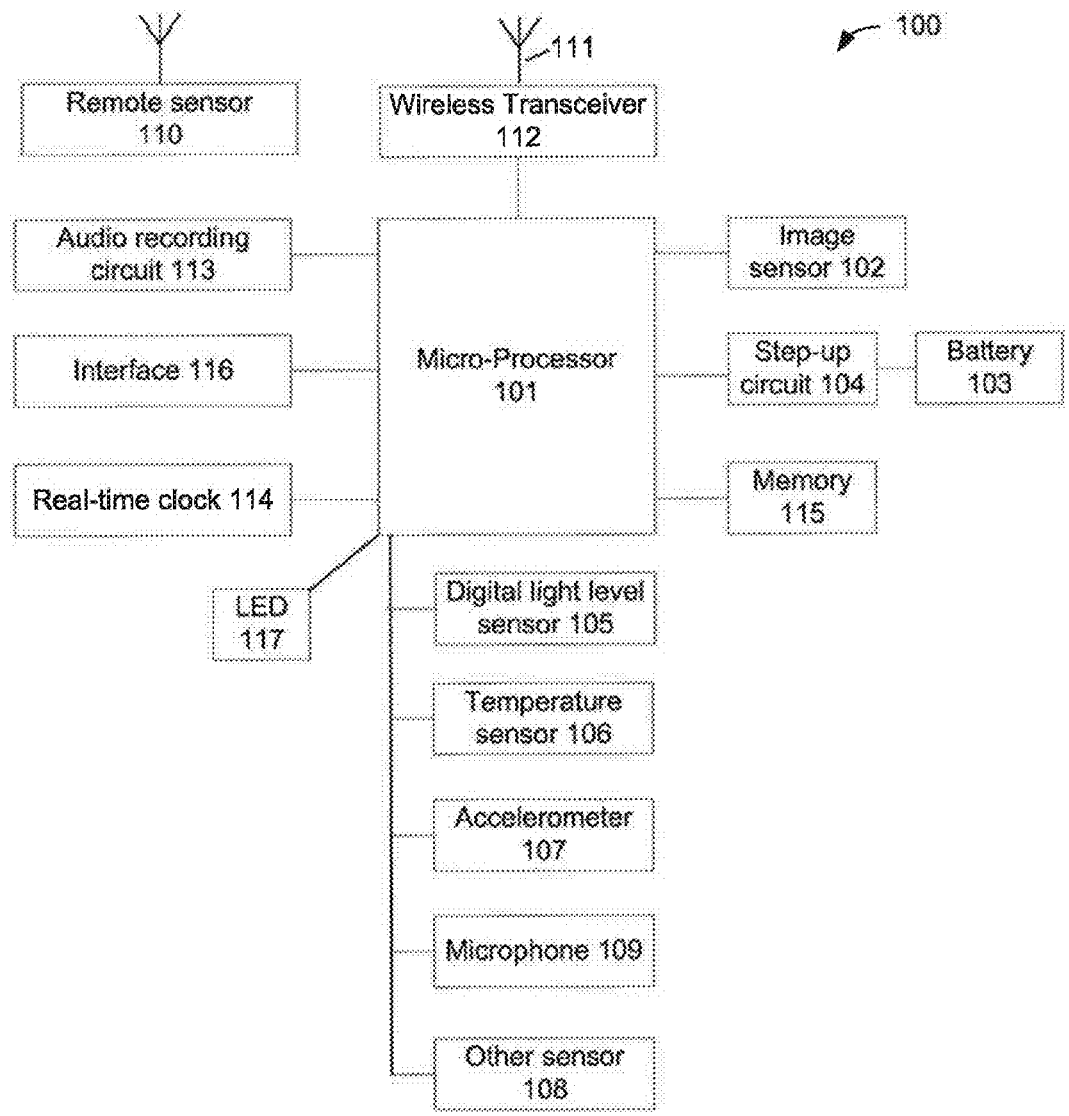
FIG. 1 is a schematic diagram of an automatic image capture device.

FIG. 1 is a schematic diagram of an automatic image capture device 100 which comprises a microprocessor 101 connected to an image sensor 102 having a wide angle or fish-eye lens (not shown). The device is powered by a battery 103 and the voltage may need to be stepped up via a step-up circuit 104 to power the microprocessor 101. The microprocessor triggers the capturing of an image when data from one or more sensors 105-110 indicates that a specified capture condition (also referred to as a capture trigger) has been met. The sensors may be integrated into the device, such as a digital light level sensor 105, a temperature sensor 106, accelerometer 107, microphone 109 or other sensor 108 or alternatively the sensors may be external to the device (e.g. remote sensor 110) with the sensor data being received by the antenna 111 connected to the wireless transceiver 112. The data from the accelerometer 107 is also used to mitigate against, and/or correct for, blurring of the images due to motion of the wearer (e.g. by detecting a stable condition prior to initiating image capture). The device also comprises audio recording circuitry 113, a real time clock 114 and memory 115. The memory 115 may comprise one or more elements and may comprise a combination of memory which is integral to the device and removable memory (e.g. a SD card). The device may also have an interface 116 (e.g. a serial interface such as a USB or RS-232) interface) for uploading and downloading data to/from the device. Alternatively, such uploading and downloading may be done over a wireless link via the wireless transceiver 112 or via a removable memory element. The device 100 may also have one or more LEDs (light emitting diodes) 117 or other visual feedback elements (e.g. a LCD display screen).

The elements shown as part of the automatic image capture device 100 in FIG. 1 are shown by way of example only. Other examples of capture devices may comprise a subset of the elements shown in FIG. 1 and/or may comprise additional elements. For example, a device may have more than one wireless transceiver, and these multiple transceivers may operate using different wireless technologies, e.g. a Bluetooth transceiver, an infra-red transceiver etc. In other examples, the device may only comprise a wireless receiver, rather than a transceiver, (which is a transmitter and a receiver). Devices may also have many different sensors integrated within the device, e.g. GPS element. Furthermore, other sensors may be used instead of the accelerometer 107 for image stabilisation.

The term 'wireless' is used herein to mean a connection which does not involve a physical connection, i.e. a connection which is not 'wired'. It encompasses free space communication over the electromagnetic spectrum including RF communication, infra-red communication and free space optical communication.

Figure 2:
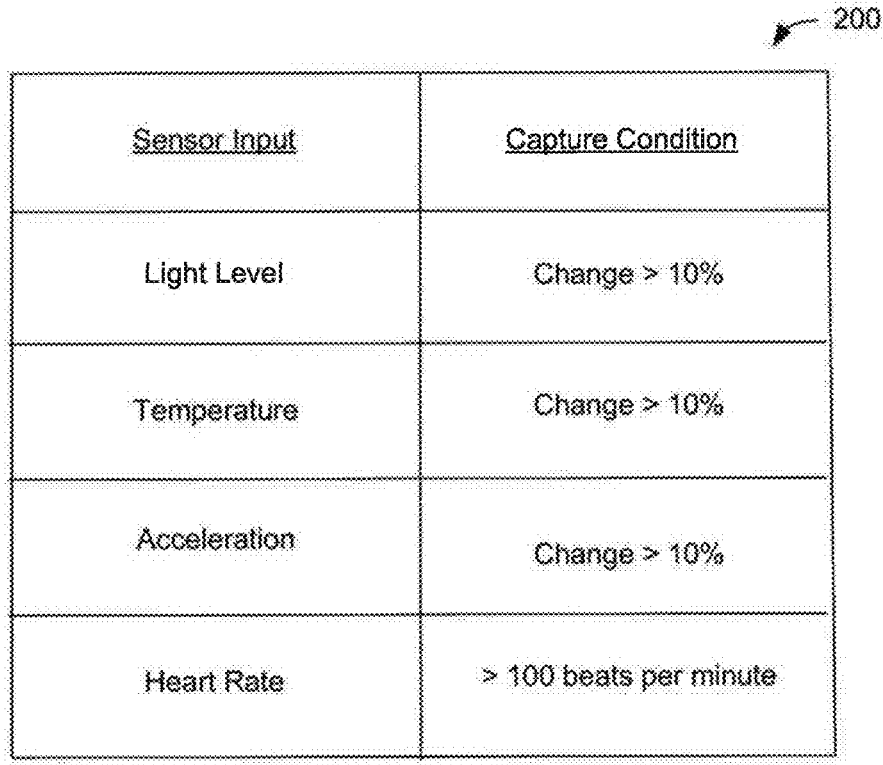
FIG. 2 is a table showing an example set of capture conditions for a capture mode.

The automatic image capture device 100 has a number of different capture modes. Each capture mode defines the circumstances when an image will be captured (e.g. a photograph will be taken), such as a required change in light level, required stable period, minimum/maximum period between capturing images, whether images are captured when other people or other automatic image capture devices are detected etc. A capture mode therefore defines a set of capture conditions (or capture triggers) which will trigger the capturing of an image, for example, a capture mode may define that an image is captured if the light level changes by more than 10%, and/or if the temperature changes by more than 10%. A set of capture conditions may comprise a single capture condition (e.g. capture an image at 10:05 am) or multiple capture conditions based on the different sensors that are integrated with or communicating with (in the case of remote sensor 110) the capture device 100. Examples of some of the parameters defined by a capture mode are shown in the table 200 in FIG. 2 where the device is connected to a remote heart rate monitor (e.g. as a remote sensor 110). In addition to defining the capture conditions, as shown in FIG. 2, a capture mode may define other operating parameters for the device, as will be described in more detail below.

Figure 3:
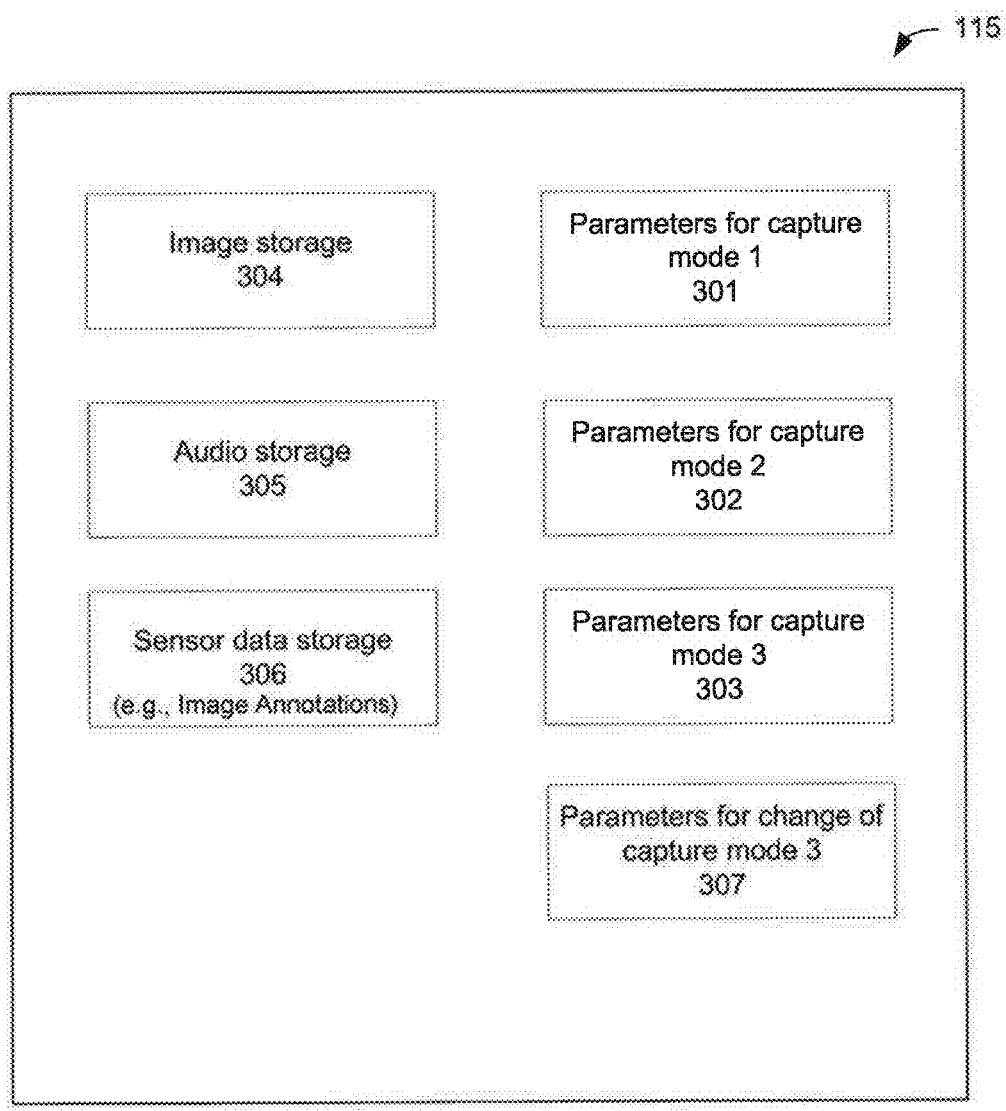
FIG. 3 is a schematic diagram of the memory in the automatic image capture device of FIG. 1.

The parameters for each capture mode are stored in the memory 115 on the device, as shown in the schematic diagram of FIG. 3 for a device with 3 capture modes. The memory 115 is used to store the three sets of parameters 301-303 in addition to the images 304, audio information 305 (recorded using microphone 109 and audio recording circuit 113) and sensor data 306. The memory 115 may also be used to store parameters which describe when the device should change between capture modes 307. As described above, although the memory 115 is shown as a single element, this is by way of example only and it may comprise multiple elements. Each memory element may be used to store one or more of the types of information shown in FIG. 3 and in some examples, all or part of a memory element may be dedicated to a particular type of information, for example, the information used to operate the device (including the capture mode parameters 301-303) may be stored in a dedicated portion separate from the memory used to store data (e.g. images, audio and sensor data) captured by the device.

Figure 4:
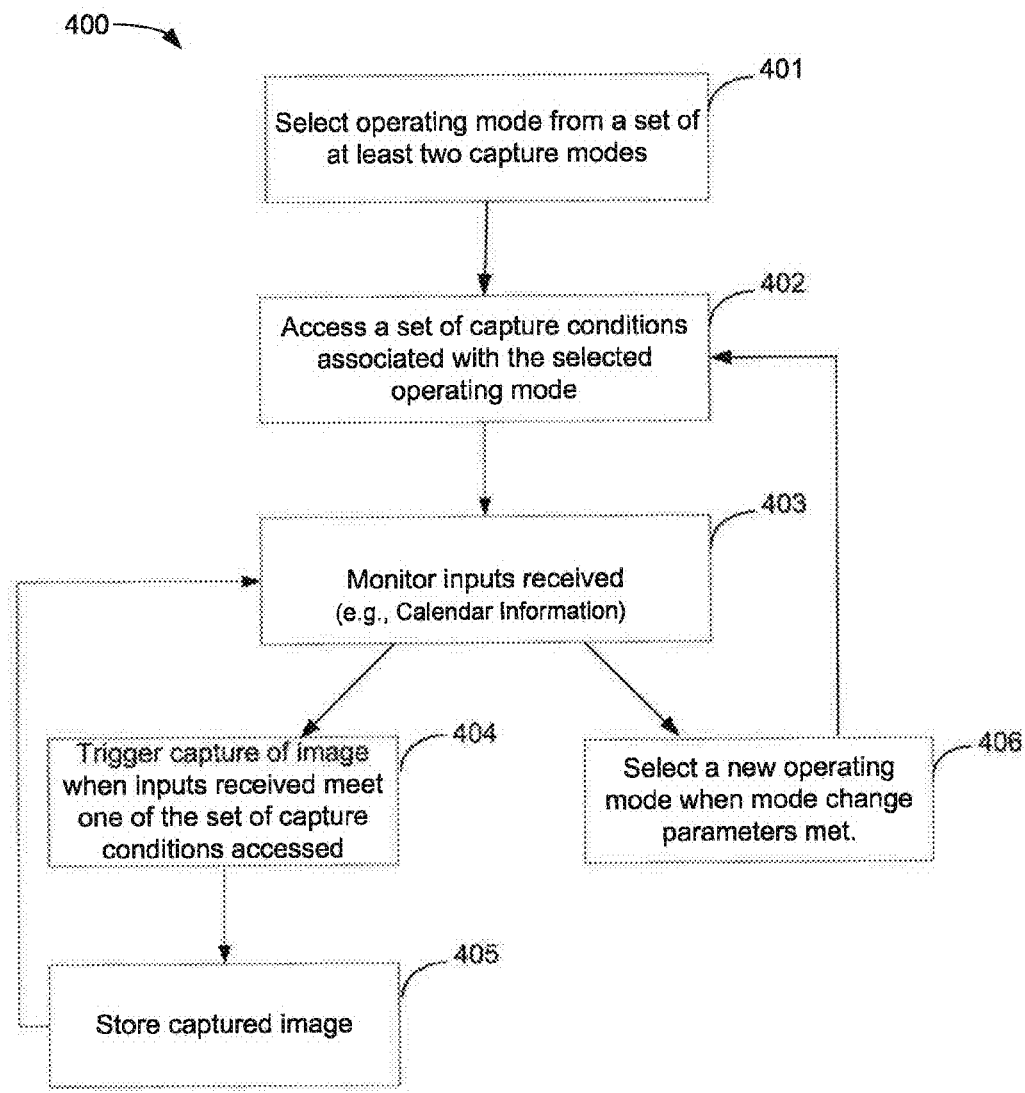
FIG. 4 is an example flow diagram showing the operation of the automatic image capture device of FIG. 1.

The device may have one or more pre-set capture modes, which are not user defined, and/or one or more user-defined (or user-customised) capture modes. FIG. 4 is an example flow diagram 400 showing the operation of the automatic image capture device 100. An operating capture mode (e.g. a pre-set capture mode or a user-customised capture mode) is selected (step 401) from a set of available capture modes on the device. For each available capture mode, a set of parameters is stored in the memory of the device (301-303), as described above and once a capture mode has been selected to be the operating mode (in step 401), the appropriate set of parameters defining capture conditions is accessed (step 402). The device 100 then monitors the inputs it receives (step 403) until the inputs received meet one of the capture conditions defined by the accessed parameters, when capturing of an image is triggered (step 404). The captured image is stored in memory 115 (step 405) and the device continues to monitor inputs (step 403) until the capture conditions are met again (step 404). If mode change parameters are satisfied, a new operating mode is selected (step 406) and then a new set of capture conditions is accessed (step 402). This new set of capture conditions is then used to determine whether an image should be captured (step 404).

The pre-set capture modes may define parameters for particular uses of the device or for particular situations. For example, different parameters may be appropriate if the device is to be used as a memory aid for a memory-impaired individual compared to if the device is to be used to automatically generate a diary for the wearer. Examples of different pre-set modes which may be defined for particular generic situations are described below.

Different modes may be provided for different environments, such as inside and outside. This may be beneficial because the range in light levels experienced inside a building may be quite small. Consequently, the trigger point for light level, when operating in 'inside mode' may want to be smaller than when in a general purpose or an outside mode.

Different modes may be provided for different event types, for example a 'meeting mode'. This may be beneficial to prevent the device taking many images of the same person or people in a meeting, by not using a PIR sensor data as a trigger in this mode. Alternatively, a minimum time between capture events triggered by the PIR sensor date could be specified. This would not prevent capture of images triggered by other sensor data but would reduce the number of duplicate images of the same people taken during a meeting.

A 'holiday' or 'tourist' mode may be defined in which the device is set to capture images in response to receiving particular signals via the wireless transceiver 112. Such signals may be transmitted by beacons or transmitters in places of particular interest or beauty. The signals may include information on the panorama being photographed and the signal (and hence the information) may be stored in the memory 114 of the device. This information may also be stored as metadata within the image file (e.g. as described in the JPEG specification). Other information may also be stored as metadata within the image file, including, but not limited to, location information, sensor data and audio information.

A 'timed capture' mode may be used to ensure that images are captured at particular times of the day, for example, the capture mode could define that images are taken on the hour every hour. This may be in addition to, or instead of, any images that may be captured in response to sensor triggers.

A 'docked mode' may be provided in which the device operates as a webcam and takes images as triggered by an external signal, (e.g. from a computer) or stream sequences of image (or video streams) to a computer. The triggering of image capture based on sensor input may be restricted (e.g. by setting extreme capture conditions) or prevented. Examples of an external trigger include a trigger from an instant messenger (IM) program such as MSN (trade mark) Messenger. An IM program could be set to trigger the capture of an image when a new IM conversation is initiated and the IM program could then use the captured image as the user's picture and send this to the other party in the conversation. In another example, the external trigger could be provided when a voice call is initiated, either using standard telephony or VoIP (voice over internet protocol). The image captured when the call is initiated could be sent instead of, or in addition to, the caller ID (identification) information so that the recipient of the call can see a current image of the person calling them. This would provide additional information to the called party (e.g. what the caller is wearing, whether they look happy or sad etc) without invading the privacy of the caller. In a similar manner, an image could be triggered when a call is received, via IM, telephone or VoIP and the captured image transmitted to the caller in a similar manner to that described above.

A 'variable exposure' mode may be provided in which the requirement for a stable condition (as detected by the accelerometer) before an image is captured is relaxed, and instead the exposure setting used to capture a an image is varied according to the motion of the device 100 as detected by the sensors. For example, the definition of a stable condition may be changed from <20°/second to <50°/second, or alternatively, the capture conditions could remove the requirement for detection of a stable condition. In order to minimise the blurring on images captured in this mode, the exposure time for image capture is varied in proportion to the motion of the device, as detected by the sensors, such that a longer exposure time is used when the device is moving less and a shorter exposure time is used when the device is moving more. Such a mode may be useful for a device used during sporting events, when the likelihood of achieving a stable condition is reduced but the user still wishes to capture images. This variable exposure function may also be incorporated into other capture modes, for example as an operating parameter.

A mode may be provided in which image assessment algorithms may be used in conjunction with the sensor information such that very similar images, although initially captured, are discarded and not stored. The algorithm may compare only adjacent images in time or may compare sets of images that are captured over a short period of time. An example method of comparing images is described below with reference to FIGS. 8-11.

The similarity between two images can also be described in terms of the distance between two images, and one technique for calculating this distance is to use the sum of absolute differences (SAD) between two histograms, one for each of the images. Any suitable histograms may be used, for example colour histograms or texton histograms. Colour histograms look at the relative amount of each colour in an image. A texton histogram looks at both the colour and the texture in an image.

In order to calculate the SAD of the texton histograms of the two images, i and j, a universal vocabulary of textons is required. This universal vocabulary of textons may be determined away from the automatic image capture device and once determined the vocabulary may be stored in the memory 115 of the device 100. The universal vocabulary of textons is defined on the basis of many training images and the vocabulary is typically application dependent, so the training images are preferably of a similar type to the actual images that will be compared. For example images taken by a SenseCam have distinctly different properties from images taken by a conventional digital camera. Consequently, it would be appropriate to use SenseCam images as training images when the intended use of the vocabulary is to compare SenseCam images and standard digital camera images should be used as training images when the intended use of the vocabulary is to compare standard digital camera images. Where other types of images are to be compared, an appropriate set of representative images should be used as the training images in order to define the universal vocabulary.

Figure 8:
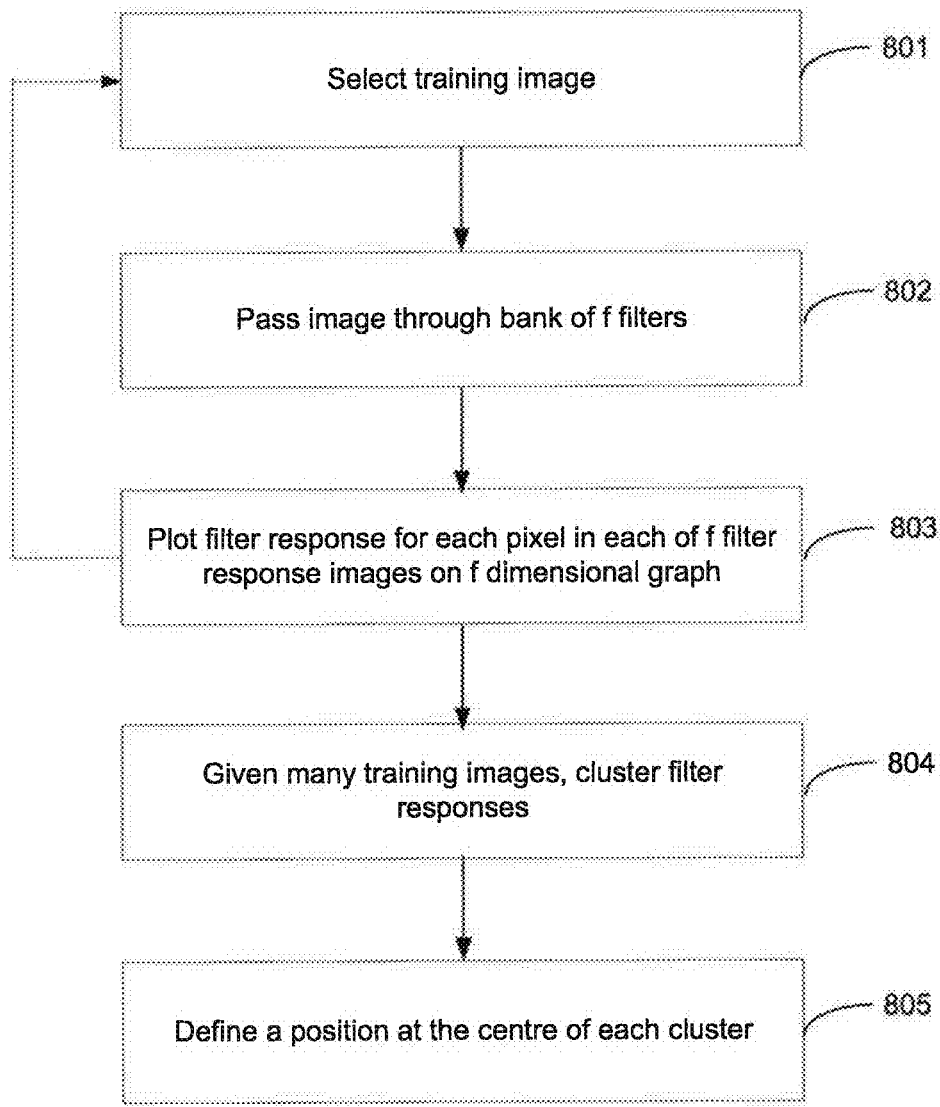
FIG. 8 is an example flow diagram showing a process for defining a universal texton vocabulary.
Figure 9:
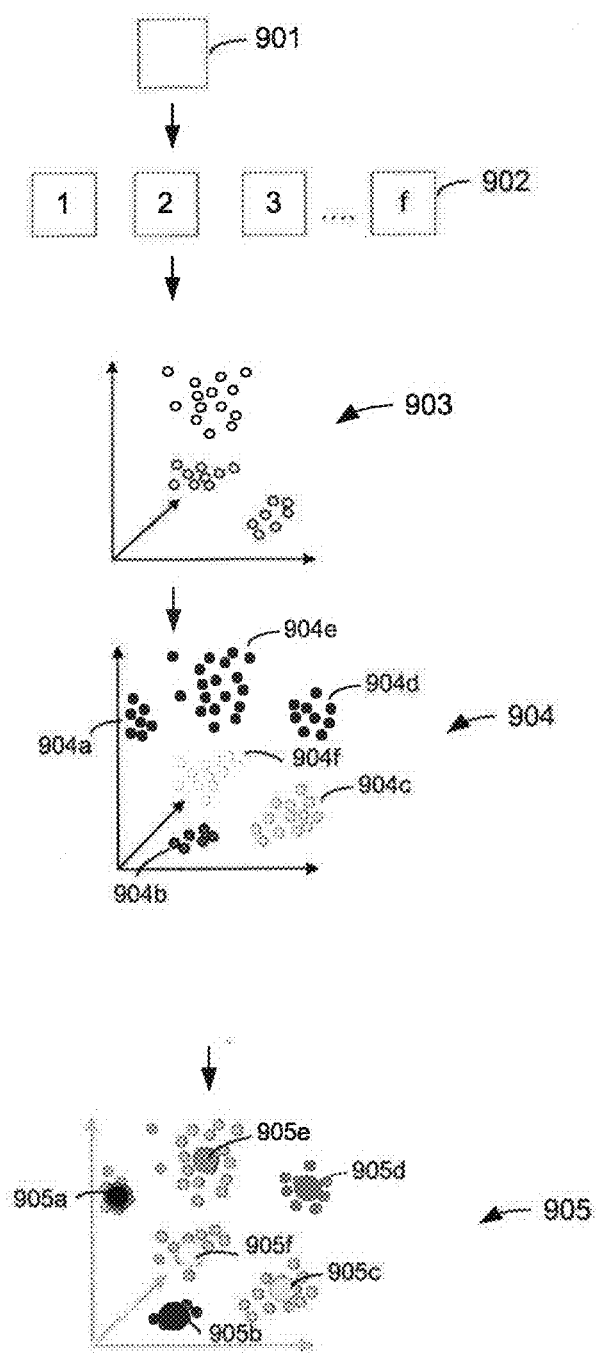
FIG. 9 is schematic diagram of stages in the process for defining a universal texton vocabulary shown in FIG. 8.

The process of defining the universal vocabulary can be described with reference to FIGS. 8 and 9. A first training image 901 is selected (step 801) and this image is passed through a bank of filters (step 802), such as a bank of Gabor filters, where f is the number of filters used. It is the use of filters in this manner which enables texture information to be obtained. The filters typically capture information from an area of 10×10 pixels around each pixel. Typically a bank of 17 filters are used, (f=17) and the same filter set can be used for any application or any image type. The output of this step (step 802) is a set of filter response images 902, one image for each filter (i.e. f filter response images). The filter response of each pixel in each filter response image is then plotted in f dimensions (step 803). Considering a particular pixel at position (x,y) in the original training image 901, there are f filter responses, one for each filter in the bank (i.e. the filter response at position (x,y) in each of the f filter response images 902). This creates a vector with f elements, $(r_1, r_2, r_3, \ldots r_f)$ which can then be plotted on the f-dimensional graph 903. These three steps (801-803) are then repeated many times with different training images and all the points are plotted on the same graph 904. Clusters 904a-f of points on the graph are then identified (step 804), for example using the k-means algorithm, and a position 905a-f at the centre of each cluster is defined (step 805). The result is therefore a set of vectors, each comprising f elements, each defining the position at the centre of a cluster. This set of vectors (6 vectors in the example shown in FIG. 9, although typically there are 50 vectors or 'visual words') is the universal vocabulary of textons (for images of the same type as the training images used). Each visual word (or vector) results in a bin in the texton histogram, as described below. A small number of words (and hence bins) results in faster processing speed when performing the comparison between images, however, a larger number of words provides a better measure of the similarity of two images.

Figure 10:
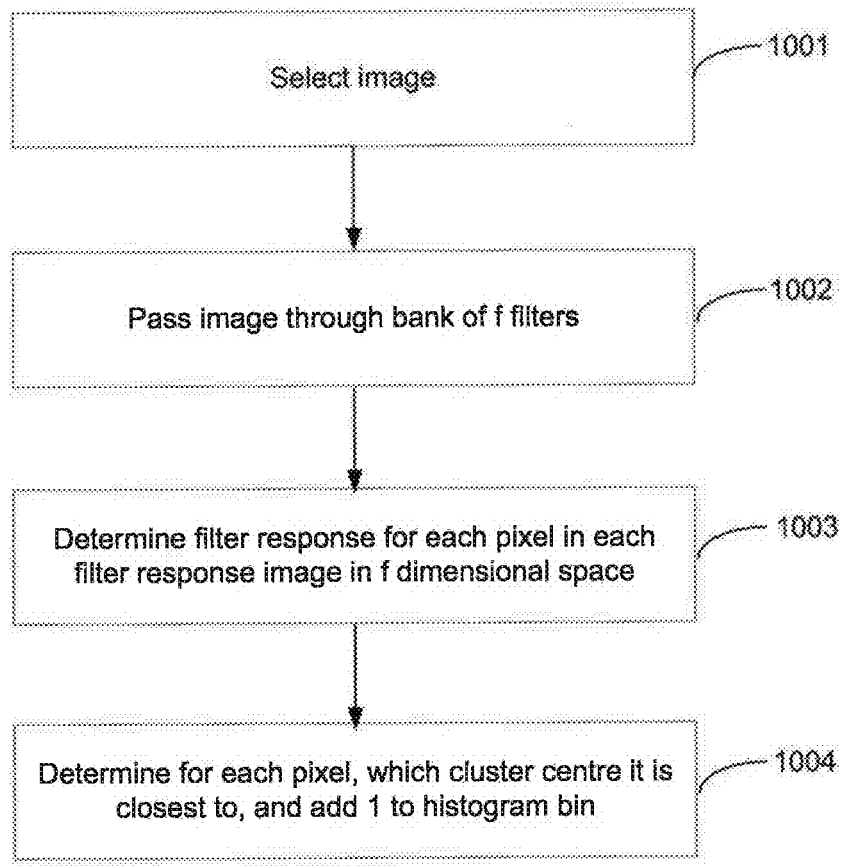
FIG. 10 is an example flow diagram showing a method for determining a texton histogram of an image.
Figure 11:
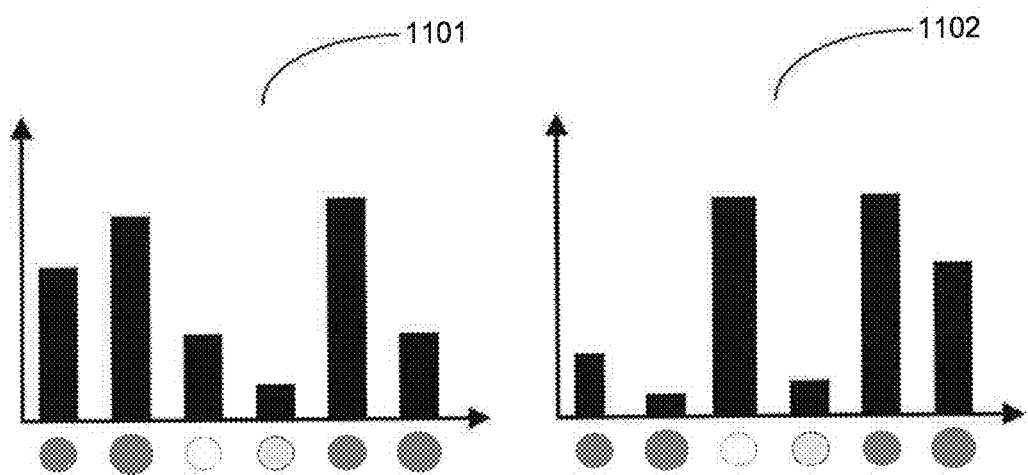
FIG. 11 shows two examples of texton histograms.

Having determined the universal vocabulary of textons, which may be done away from the device (as described above), the texton histogram of an image can be calculated, as shown in FIG. 10. The image is selected (step 1001) and passed through the same bank of f filters used in determining the universal vocabulary (step 1002). The filter response for each pixel of the image is then determined for each of the f filters to provide a position in f-dimensional space (step 1003) and then this position is compared to the universal vocabulary (e.g. the 6 visual words shown in 905) to determine which cluster centre position (defined in step 805) each pixel is closest to. The results are plotted on a histogram with one bin for each visual word and with one entry per bin for each pixel which is closest to that visual word. Examples of two texton histograms 1101, 1102 are shown in FIG. 11. The SAD of the texton histograms of the two images can then be calculated (i.e. the sum of the absolute differences between the size of each bin).

A threshold value of the SAD may be set, such that if a first captured image is compared to a second captured image and the resulting SAD is below the threshold then one of the images may be deleted and not stored. Additional criteria may be used to determine which of the two images is retained including, but not limited to, the sharpness of the image and the capture condition triggering the capture of each image.

Such algorithms and techniques may be used within a pre-set mode or may be used in a user-customised mode (e.g. via a check box to implement the algorithm or not). The user may be able to specify a parameter indicating the minimum degree of similarity of two adjacent stored images (e.g. a SAD threshold as described above). User-customised modes are discussed in more detail below.

In another example, image assessment techniques may be used to define a mode for specifically capturing faces (or other objects). An example of a face detection algorithm is described in a paper by P. Viola and M. Jones entitled 'Robust Real-Time Object Detection' presented at the International Conference on Computer Vision (ICCV) 2001. Information obtained using the object detection algorithm may be used both to trigger the capturing of an image and to annotate the image once captured.

In some situations the taking of photographs may not be permitted, e.g. whilst in the immigration hall at an airport or in a courtroom. Without user intervention, an automatic image capture device would inadvertently continue to capture images according to the defined capture conditions. To address this, the device may be provided with a 'Capture prevented' pre-set mode which the device automatically switches into on receipt of a special wireless signal transmitted from a transmitter or beacon, or other signal which can be detected by the device (e.g. sound, particular GPS location information or other sensory input). A user may also manually switch the device into this mode (as described below), for example if they enter a sensitive area (e.g. hospital) or attend a sensitive event (e.g. funeral). In this mode, no images will be captured either for a specified period of time (e.g. for the next 10 minutes) or whilst the special wireless signal can be received. In such a mode the user may not be able to override the device and switch it to another mode to permit the capture of images, unless the user actually initiated the switch into this mode. In another example, the user may be able to override the device, but the user interface may be arranged to ensure that the user cannot accidentally initiate the switch into another mode.

The above examples of pre-set modes are provided by way of example only. Other pre-set modes may be provided which combine features of one or more of the modes described above. In addition to, or instead of, the pre-set modes, the device may have one or more user-customisable modes. These user-customisable modes may include aspects of the pre-set modes described above.

A user-customisable mode allows a user, which may not necessarily be the wearer, to define their own capture conditions. Where a device is used (and worn) by different people at different times, such as by various members of a family, each member may define one or more capture modes for use when they are wearing the device. The user-customised modes may use any of the ideas described above with reference to pre-set modes and may combine aspects of two or more pre-set modes. For example, the user may wish to customise the 'timed capture' mode (described above) so that they can specify times at which they want images to be captured, irrespective of the presence or absence of any sensory triggers. In an extreme, a timed capture mode may be used to ensure that a single image is captured at a particular time and that no other images are captured.

Figure 5:
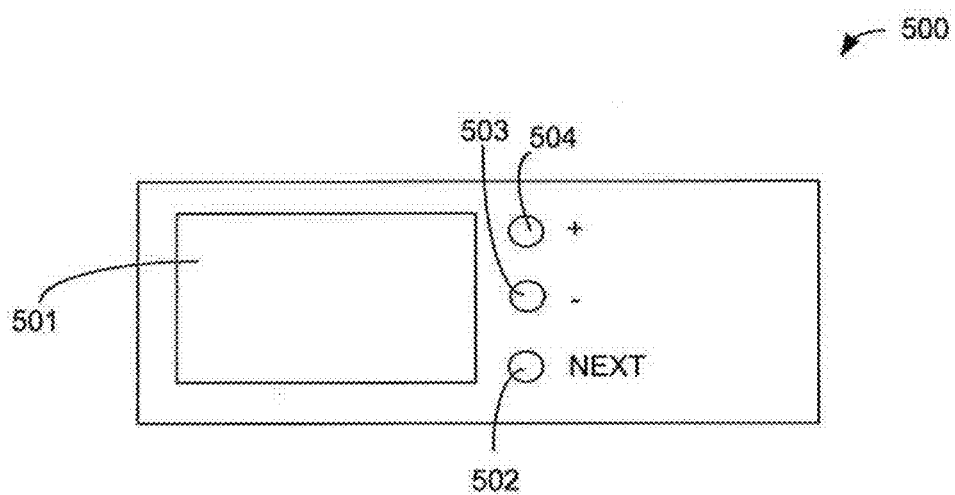
FIG. 5 is schematic diagram of a face of an automatic image capture device.

In one example, the user may be able to specify the parameters for the capture mode by input to the device directly. FIG. 5 shows a schematic diagram of a face of an automatic image capture device 500 which enables such direct input of parameters. The device 500 has a display 501, such as an LCD panel, and three buttons 502-504. The user can scroll through the parameters (viewed on the display 501) using the 'next' button 502 and change any values as required using the '+' and '−' buttons 503, 504. Alternative user input arrangements may be used as known in the art.

Figure 6:
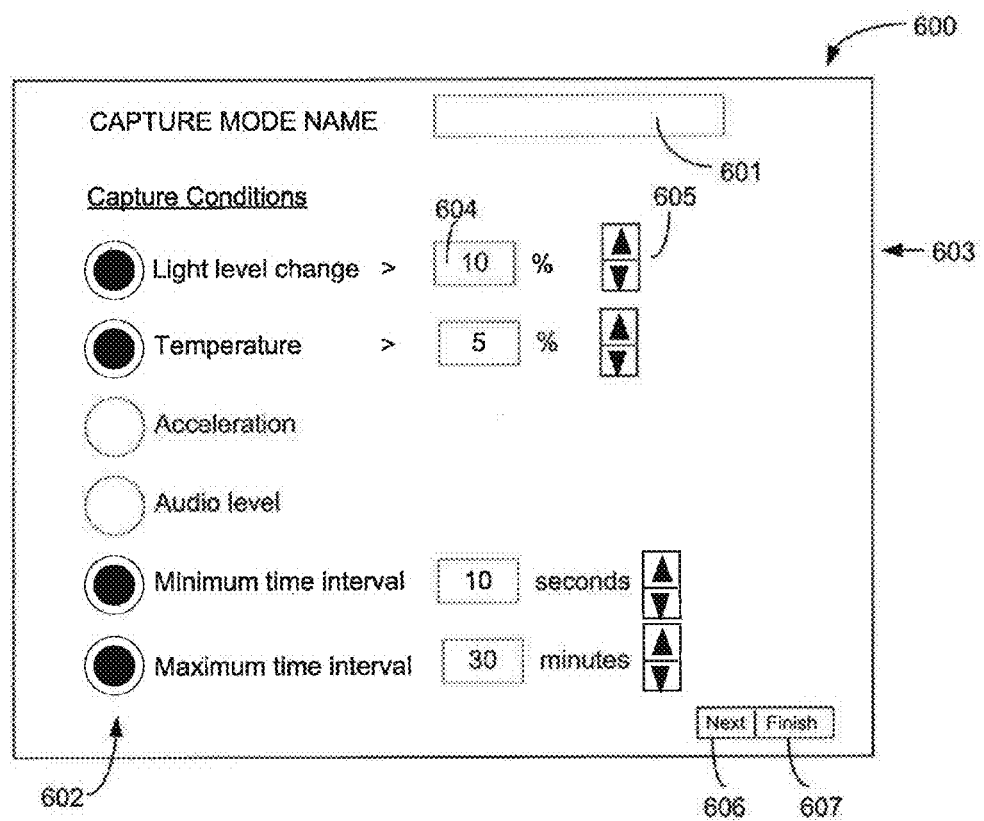
FIG. 6 shows an example screen of a user interface.

In another example, the user may specify the parameters for the capture mode via a user interface (UI) on a computer. An example screen 600 of a user interface is shown in FIG. 6. This enables the user to specify the name of the capture mode in box 601 and to indicate which sensor inputs they wish to use to define capture conditions using buttons 602. If a sensor input is selected (e.g. light level change 603), then the user can specify the condition by typing the required value in the box 604 or using the up and down arrows 605. The user may also be able to change the comparison operator (<⁠/⁠=⁠/⁠>, not shown in FIG. 6). There may be several screens within the UI that can be scrolled through using 'Next' buttons 606 and 'Back' buttons (not shown). When the user has finished specifying the capture mode, the 'Finish' button 607 is pressed by the user. This may cause the generation of an XML file which may then be uploaded to the device and stored in memory (as described above). The uploading of the parameters to the device may be via an interface (such as interface 116 in FIG. 1) or via a wireless link (e.g. to the wireless transceiver 112 in FIG. 1). In another example, the user may specify the parameters for the capture mode by editing the XML file directly, for example by using a text editing program on a computer. Having defined one or more user-customisable modes, these modes may be edited using an interface on the device (if present) or via a user interface on a computer.

As described above, an automatic image capture device may have stored in its memory 115 details of several capture modes, some of which may be pre-set modes and some of which may be user-customisable modes. The device can only operate in a single mode at any one time and the device may provide a visual indication to the user of the mode that the device is currently operating in. Where the device has a display (e.g. display 501 in FIG. 5), the display may indicate the name of the mode being used. Where the device has one or more LEDs (e.g. LED 117 in FIG. 1) these may be used to provide an indication of capture mode, according to the colour or its status (on/off/flashing). In another example, an audible indication of the operating mode may be provided to the user in response to user input (e.g. gesture, pressing of a button).

Switching between capture modes may occur automatically in response to an external input, sensory information or device status. In addition, or instead, the device may be switched between capture modes in response to user input. If the automatic image capture device has buttons (as in FIG. 5) or a dial 701 (as in FIG. 7), these can be used to manually switch between capture modes. In another example, gestures may be used to cause the device to switch between modes, with the device being programmed to recognise the sensory inputs associated with the gestures. In another example, voice recognition may be used on audio detected via the microphone (item 109 in FIG. 1). In a further example, the position of the device when it is switched on (e.g. which face is oriented downwards) may be used to specify the mode that the device operates in. The parameters defining when the device switches between capture modes may be stored in memory 307 (see FIG. 3).

The automatic image capture device 100 may automatically switch between capture modes in response to data obtained from an external calendar such as Microsoft Outlook (trade mark) or external database. The calendar information may be used to determine the most appropriate capture mode at a particular time. For example, the calendar information may identify when the wearer will be in a meeting and therefore the device may automatically switch into 'meeting' capture mode at the planned start time of the meeting and switch out of this mode at the planned end time of the meeting. The calendar information may also be used to annotate any images captured during the meeting (or other event in the camera). The annotations may be stored with the sensor information (e.g. in the sensor data storage 306), as part of the image file (e.g. as meta-data, as described above) or elsewhere. Location information obtained from the calendar may be used instead or in addition to annotate the images. This may be particularly useful where other location information (e.g. GPS location information) is not available (e.g. GPS location information is often not available in a building). List of attendees at an event may also be used to annotate images captured during the event, particularly if face detection algorithms are used to determine the presence of a face in an image. This may assist the viewer of an image (or someone searching images) in identifying who is in a particular image.

In order for this inter-working between a calendar program and the capture device 100, an interface program may be used. The interface program may run on the user's computer and may search for particular keywords or event types in the calendar program (e.g. meetings, social events, funerals etc) and then generate a file which is small in size and which can be uploaded to the device 100 in advance of the events. The file may comprise a sequence of modes that the capture device 100 should progress through with information on the particular times at which the mode changes should occur. The file may be stored in the memory 114 (in part 307, as shown in FIG. 3) and accessed by the microprocessor 101 to determine when mode changes should automatically occur. In another example the functionality of the interface program may be integrated into the calendar program.

In another example, the capture device 100 may have a calendar program that runs on the device and this may trigger the automatic changing of the capture mode e.g. at the instant the change is required. As with current mobile devices which have calendar programs running on them, the calendar program may be operated in a stand alone manner or may be synchronised with a calendar program running on the user's computer (e.g. via interface 116 or wireless transceiver 112).

Where the device is used by more than one individual, the wearer of the device may be determined from an external RF input such as an RFID (Radio Frequency Identification) tag associated with the wearer or a Bluetooth signal from the wearer's mobile phone or PDA (personal digital assistant). Based on this information on the wearer of the automatic image capture device, the device may automatically switch into a default capture mode specified by that wearer, which may be a mode customised by the wearer.

The automatic image capture device may switch between capture modes in response to the device status, e.g. upon connection to a computer. For example, where the device has a 'docked' mode where it operates like a webcam, the device may automatically switch to this mode when it is connected to a computer via a physical connection (e.g. by a USB lead connected into interface 116) or wirelessly (e.g. over a Bluetooth link via wireless transceiver 112).

Another example of where device status may cause the device to switch between capture modes is when the device battery (item 103 in FIG. 1) begins to run low. Upon detection of a low battery situation, a warning (e.g. visible or audible warning) may be provided to the user and the device may switch to a capture mode which is less battery intensive. This may involve switching off some of the sensors and/or stopping receiving signals from remote sensors (item 110 in FIG. 1) and using a reduced set of sensors to indicate capture conditions. A further example of where device status may cause the device to switch between capture modes is when the available memory goes below a threshold (e.g. remaining capacity goes below 50 images). The device may switch to a capture mode where the minimum time between image capture is increased (e.g. from 10 seconds as shown in FIG. 6 to 144 seconds). Again, a warning may be provided to the user.

In the above description, the device switches automatically to a less battery/memory intensive capture mode when the battery level/memory falls below a threshold. In another example, the user may specify as part of a user-customised capture mode, what changes the device should make when either a low battery or low memory warning level is reached. The user may also specify the thresholds at which the low battery and the low memory warnings occur.

The automatic image capture device may switch between capture modes in response to sensor information. In an example, the device may also switch automatically to the 'docked' webcam mode when no motion is detected and when light and temperature readings remain constant for a period of time. This suggests that the device is now in a fixed position.

Where a low memory warning occurs, image assessment algorithms may then be used on subsequent captured images so that the point when the memory becomes full is delayed if possible. An example algorithm is described above in relation to the 'change of scene' capture mode. In addition (or instead) the algorithms may be used on some or all of the stored images with very similar adjacent images being deleted. This may free up considerable memory space but is processor intensive and power intensive. However, the processor load may be spread in time by running the image assessment algorithm in the background on the camera to identify a candidate set of images for deletion should the available memory become limited. This candidate set may identify images for deletion in a particular order, such that images which are virtually identical to a retained image are deleted first and images where the differences are greater are deleted subsequently. In addition to weighting images by similarity for deletion, older images may also be weighted such that they are more likely to be deleted than more recently captured images. By deleting images in this ordered way, the device may operate such that it never reaches a point where its memory is totally full. As it approaches the point that the memory will become full, an image can be deleted so that a new image can be saved. This will result in the wearer having a sampled record of all the time that they were wearing the device, rather than missing the latter portion. The operation will, in this situation, ultimately be limited by battery life. In another example, the device may also modify this deletion process based on historical information. If the device is historically docked and the data downloaded between 5 pm and 6 pm every day, then the device may assume that the device will again be docked at between 5 pm and 6 pm and if the available memory begins to run low, the device may manage the memory on the basis that it will reach full capacity at 6 pm.

Figure 7:
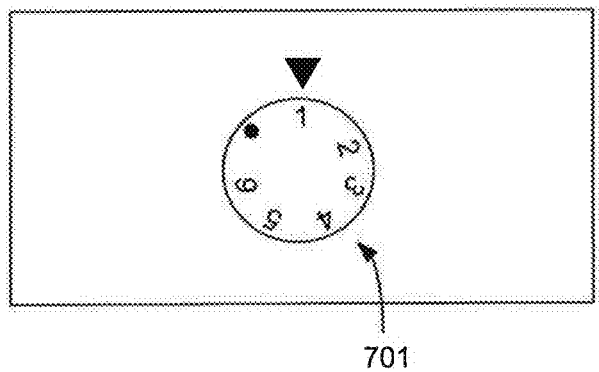
FIG. 7 is another schematic diagram of a face of an automatic image capture device.

In addition to being able to customise a capture mode, as described above, for example using a user interface as shown in FIG. 6, the user may also be able to customise the conditions upon which the device automatically changes between capture modes. This may be specified on camera or off camera (e.g. on a computer) in an analogous manner to the specification of the capture mode. In some examples, the user may not be able to specify when the 'Capture prevented' mode is used by the device (as described above). As described above, these conditions may be stored within a part 307 of the memory 115 (see FIGS. 1 and 3).

Where the automatic image capture device has a dial 701, as shown in FIG. 7, the user may also be able to customise the effect of each of the settings (e.g. settings 1-6 in FIG. 7) on the device. For example, where the device has 5 pre-set capture modes and 5 user-customised modes, the user may define that settings 1-5 correspond to the 5 user-customised modes and setting 6 corresponds to a selected one of the 5 pre-set capture modes. Where the device has, instead of a dial, a set of buttons or other input device, the user may similarly be able to customise the input device.

The above description is not limited to the SenseCam device developed by Microsoft Research, but is applicable to any image capture device which has the capability to capture images automatically, e.g. when predefined capture conditions are met. The capture conditions may not necessarily be related to sensor data but may be related to other parameters.

Although the above description relates to a wearable automatic image capture device, this is by way of example only. The device could alternatively be a portable device or a device which is operated in a static position e.g. in a building or in a car. Where the device is operated in a fixed position in a building, the different modes may be used depending on whether the room/building is occupied or not and in this situation the modes may be changed automatically on receipt of an external signal (e.g. a signal indicating that the building's alarm system has been activated or deactivated or that the alarm system has been triggered). Where the device is operated in a static position within a vehicle, the different modes may be used depending on whether the vehicle is switched off, stationary or moving. Where the vehicle is an emergency services vehicle, another mode may be used when the blue lights are switched on. In the vehicle example, the modes may be switched automatically in response to an external signal received from the vehicle's control system.

Although the above description relates to a device used either as a memory recall aid or as a diary generation tool, the device could be used in many different applications including security or surveillance (see building and vehicle applications described above), health monitoring, fitness/sport (e.g. as a training record/aid), tourism and pet care.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An image capture device comprising:
a memory arranged to store a plurality of different capture modes, each of the plurality of different capture modes:
being associated with a different image capture environment; and
being associated with one or more capture triggers, at least one of the capture triggers being defined based on a user input, each capture trigger defining a condition that, when satisfied, takes a photograph of a scene in a respective image capture environment; and
a processor arranged to automatically select one of the plurality of different capture modes when one or more mode change parameters signal a change from a first image capture environment to a second image capture environment in response to input received from a calendar program, the input from the calendar program including:
a particular event associated with the second image capture environment; and
a start time for the particular event.

2. An image capture device according to claim 1, further comprising a sensor, and wherein at least one of the capture triggers defines a condition with reference to an input of the sensor.

3. A method of capturing images comprising:
automatically selecting a first capture mode from a plurality of different capture modes available on an image capture device, each of the plurality of different capture modes being:
associated with a different image capture environment; and
associated with one or more capture triggers that, when satisfied, take a photograph of a scene in the respective image capture environments, wherein selective ones of the one or more capture triggers for each different capture mode are defined with reference to an input of one or more sensors configured in accordance with the respective image capture environments;
accessing the one or more capture triggers associated with the selected first capture mode;
automatically photographing a scene when the one or more capture triggers associated with the selected first capture mode are satisfied;
obtaining calendar information corresponding to a particular event in time from a calendar program;
automatically selecting a second capture mode from the plurality of capture modes responsive to obtaining the calendar information corresponding to the particular event in time; and
switching from the first capture mode to a second capture mode associated with an image capture environment relating to the particular event in time.

4. A method according to claim 3, wherein the selective ones of the one or more capture triggers are user-defined.

5. An image capture device according to claim 1, wherein at least one capture mode is a user-defined capture mode.

6. A method according to claim 3, wherein at least one capture mode is a user-defined capture mode.

7. A method according to claim 6, wherein the user-defined capture mode is customized for a memory-impaired individual.

8. A storage medium device comprising computer executable instructions that, when executed by a processor, configure a computer to perform acts comprising:
automatically selecting a first capture mode from a plurality of different capture modes available on an image capture device, each of the plurality of different capture modes:
being associated with a different image capture environment;
being associated with one or more capture triggers that, when satisfied within timing parameters, take a photograph of a scene in the respective image capture environments;
defining a minimum time period that must elapse before capturing a first image and a second image in accordance with the one or more triggers; and defining a maximum time period that automatically captures a next image in the respective image capture environment when the one or more triggers are not yet satisfied;

accessing the one or more capture triggers associated with the selected first capture mode;

taking one or more photographs of a scene when the one or more capture triggers associated with the selected first capture mode are satisfied;

obtaining calendar information corresponding to a particular event;

automatically selecting a second capture mode from the plurality of capture modes responsive to obtaining the calendar information corresponding to the particular event;

switching from the first capture mode to a second capture mode associated with an image capture environment relating to the particular event; and taking one or more additional photographs in the second capture mode.

9. A storage medium device according to claim 8, wherein the calendar information includes a start time for the particular event and an end time for the particular event for image capture mode switching purposes.

10. A storage medium device according to claim 9, further comprising computer executable instructions that configure the computer to perform an act comprising annotating the one or more additional photographs in an image file.

11. A storage medium device according to claim 10, wherein the calendar information uses location information when:
   automatically selecting the second image capture mode; and annotating the one or more additional photographs in an image file.

12. A storage medium device according to claim 10, wherein the calendar information uses person information when annotating the one or more additional photographs in an image file, the person information including identifications of persons expected to attend the particular event.

13. A storage medium device according to claim 10, further comprising computer executable instructions that configure the computer to perform an act comprising discarding at least a portion of the one or more additional photographs from the image file via calculating a distance between two image histograms and discarding images that satisfy a similarity threshold.

* * * * *